US011586390B2

(12) United States Patent
La Fratta et al.

(10) Patent No.: US 11,586,390 B2
(45) Date of Patent: *Feb. 21, 2023

(54) MEMORY SUB-SYSTEM FOR INCREASING BANDWIDTH FOR COMMAND SCHEDULING

(71) Applicant: Micron Technology, Inc., Boise, ID (US)

(72) Inventors: Patrick A. La Fratta, McKinney, TX (US); Robert Walker, Raleigh, NC (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/498,415

(22) Filed: Oct. 11, 2021

(65) Prior Publication Data

US 2022/0027095 A1 Jan. 27, 2022

Related U.S. Application Data

(63) Continuation of application No. 16/111,974, filed on Aug. 24, 2018, now Pat. No. 11,144,240.

(51) Int. Cl.
*G06F 3/06* (2006.01)

(52) U.S. Cl.
CPC .......... *G06F 3/0659* (2013.01); *G06F 3/0611* (2013.01); *G06F 3/0673* (2013.01)

(58) Field of Classification Search
CPC ..... G06F 3/0659; G06F 3/0611; G06F 3/0673
See application file for complete search history.

(56) References Cited

U.S. PATENT DOCUMENTS

| 6,570,403 | B2 | 5/2003 | Liu et al. |
| 6,848,020 | B2 | 1/2005 | Hall et al. |
| 9,294,558 | B1 | 3/2016 | Vincent et al. |
| 11,144,240 | B2 | 10/2021 | La Fratta et al. |
| 2009/0049256 | A1 | 2/2009 | Hughes et al. |

(Continued)

FOREIGN PATENT DOCUMENTS

| CN | 101861571 | 10/2010 |
| CN | 102484130 | 5/2012 |

(Continued)

OTHER PUBLICATIONS

"", A screen shot showing the lecture presentation by prof Onur Multu, (Jul. 31, 2015).

(Continued)

*Primary Examiner* — William E. Baughman
*Assistant Examiner* — Janice M. Girouard
(74) *Attorney, Agent, or Firm* — Schwegman Lundberg & Woessner, P.A.

(57) ABSTRACT

Initialization is performed based on the commands received at the command queue. To perform initialization, a bank touch count list that includes a list of banks being accessed by the commands and a bank touch count for each of the banks in the list is updated. The bank touch count identifies the number of commands accessing each of the banks. The bank touch count list is updated by assigning a bank priority rank to each of the banks based on their bank touch count, respectively. Once initialized, the commands in the command queue are scheduled by inserting each of the commands into priority queues based on the bank touch count list.

20 Claims, 9 Drawing Sheets

(56) References Cited

U.S. PATENT DOCUMENTS

| | | | |
|---|---|---|---|
| 2009/0138670 | A1 | 5/2009 | Mutlu et al. |
| 2011/0023037 | A1 | 1/2011 | Memik et al. |
| 2011/0099341 | A1 | 4/2011 | Resnick |
| 2012/0162237 | A1 | 6/2012 | Chung |
| 2014/0101380 | A1 | 4/2014 | Svendsen |
| 2017/0235940 | A1 | 8/2017 | Mcewen et al. |
| 2018/0232157 | A1 | 8/2018 | Seo |
| 2020/0065027 | A1 | 2/2020 | La Fratta et al. |

FOREIGN PATENT DOCUMENTS

| | | |
|---|---|---|
| CN | 102968289 | 3/2013 |
| CN | 104137081 | 11/2014 |
| CN | 104160384 | 11/2014 |
| CN | 112840310 | 5/2021 |
| KR | 20140051348 A | 4/2014 |
| WO | WO-2013032816 A1 | 3/2013 |
| WO | WO-2020041690 A1 | 2/2020 |

OTHER PUBLICATIONS

"Command Selection Policy", U.S. Appl. No. 15/791,886, filed Oct. 24, 2017, 30 pgs.

"Command Selection Policy With Read Priority", U.S. Appl. No. 15/951,896, filed Apr. 12, 2018, 37 pgs.

"International Application Serial No. PCT/US2019/047887, International Preliminary Report on Patentability dated Mar. 11, 2021", 6 pgs.

"International Application Serial No. PCT/US2019/047887, International Search Report dated Dec. 6, 2019", 4 pgs.

"International Application Serial No. PCT/US2019/047887, Written Opinion dated Dec. 6, 2019", 4 pgs.

Kaseridis, K, et al., "Minimalist Open-Page: A DRAM Page-Mode Scheduling Policy for the Many-Core Era", that discloses an open-page policy gives priority to arriving requests to already opened, (2011).

Mutlu, Onur, et al., "Computer ARchitecture Lecture 21: Main Memory", Carnegie Mellon University, Spring 2015 that shows bank latency is minimal when banks/rows are already open, (2015).

Onur, Mutlu, "A lecture presentation by prof. Onur Mutlu,of Carnegie Mellon University", [Online] Retrieved from the internet: <https://web.archive.org/web/20150731035306/http://www.ece.cmu.edu/~ece740/f11/lib/exe/fetch.php?media=wiki:lectures:onur-740-fall11-lecture25-mainmemory.pdf>, (2015).

"European Application Serial No. 19850864.0, Extended European Search Report dated Apr. 25, 2022", 11 pgs.

"Chinese Application Serial No. 201980064639.7, Voluntary Amendment dated Sep. 15, 2021", w English Claims, 38 pgs.

"Chinese Application Serial No. 201980064639.7, Office Action dated Jan. 26, 2022", w English translation, 11 pgs.

MEMORY SUB-SYSTEM FOR INCREASING BANDWIDTH FOR COMMAND SCHEDULING

PRIORITY APPLICATION

This application is a continuation of U.S. application Ser. No. 16/111,974, filed Aug. 24, 2018, which is incorporated herein by reference in its entirety.

TECHNICAL FIELD

Embodiments of the disclosure relate generally to memory sub-systems, and more specifically, relate to memory controller architecture for increasing the bandwidth for command scheduling policies such as first-ready, first-come, first-serve ("FRFCFS") command scheduling policy with read priority.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
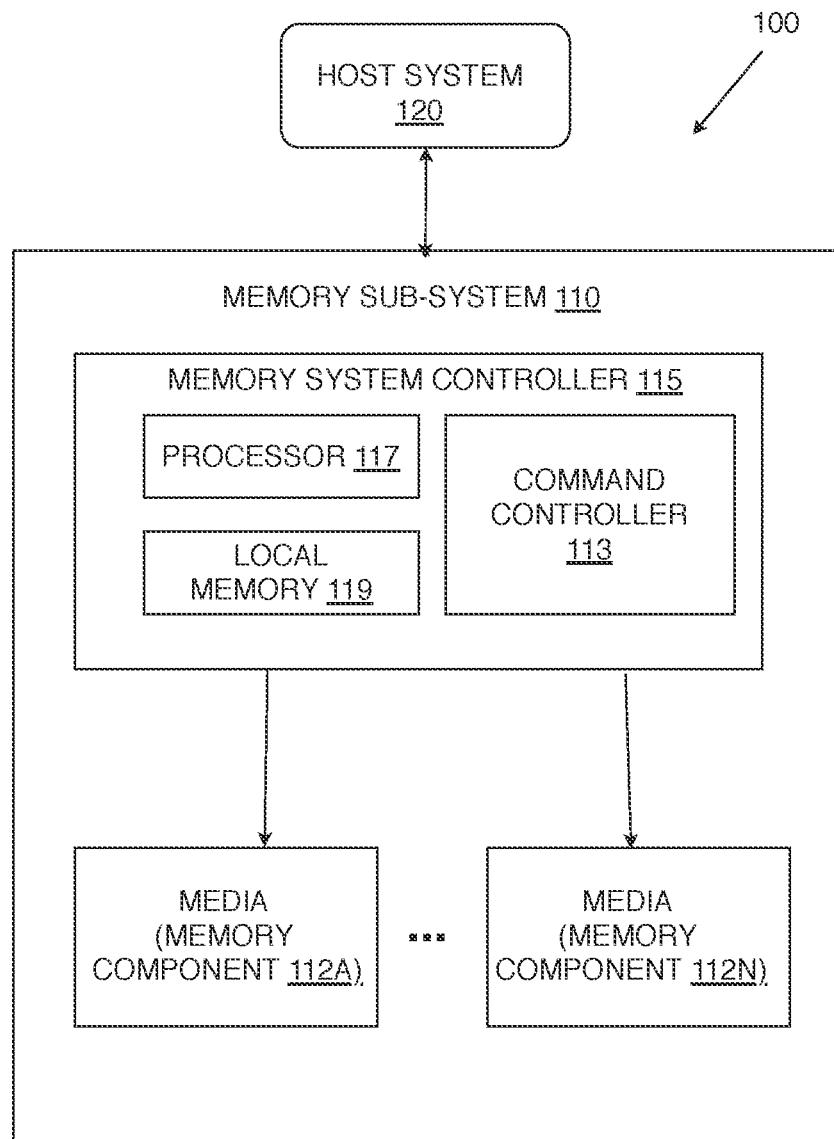
FIG. 1 illustrates an example computing environment that includes a memory sub-system in accordance with some embodiments of the present disclosure.

Aspects of the present disclosure are directed to memory sub-systems increasing the bandwidth for command scheduling. A memory sub-system is also hereinafter referred to as a "memory device". An example of a memory sub-system is a storage system, such as a solid-state drive (SSD). In some embodiments, the memory sub-system is a hybrid memory/storage sub-system. In general, a host system can utilize a memory sub-system that includes one or more memory components. The host system can provide data to be stored at the memory sub-system and can request data to be retrieved from the memory sub-system.

The memory sub-system can include multiple memory components that can store data from the host system. In an effort to reduce the latency experienced by the host system, the memory sub-system can implement command scheduling policies to prioritize certain commands. One example of a command scheduling policy is first-ready, first-come, first-serve (FRFCFS) policy with read priority. To implement a basic FRFCFS policy with read priority, the memory sub-system inserts read commands to open rows into the highest priority queue (e.g., queue 0), reads commands to closed rows into the second highest priority queue (e.g., queue−1), write commands to open rows into the third highest priority queue (e.g., queue−2), write commands to closed rows into the fourth highest priority queue (e.g., queue−3). The memory sub-system will search the first and second highest priority queues (e.g., queue 0, −1) for a ready command and select for issuance the first ready command that is found. If there are no commands in the first and second highest priority queues (e.g., queue 0, −1), the memory subsystem searches in the third and fourth highest priority queues (e.g., queue−2, −3) for a ready command and selects for issuance the first ready command that is found.

A conventional memory sub-system that strictly enforces the FRFCFS policy with read priority will often have the effect of substantially reducing the overall bandwidth. Often, the strict implementation of FRFCFS policy with read priority will cause the conventional memory sub-system to empty the command queue of all read commands, leaving only write commands in the command queue. When a later read command enters the command queue, the conventional memory sub-system will stop issuing write commands to issue the read command and then return to issuing the write commands. Switching from issuing write commands to read commands and vice-versa is referred to as "turning the bus around" and there is a penalty associated with "turning the bus around." Thus, each time the conventional memory sub-system issues a read command in isolation, the bus turnaround penalty will be incurred twice which decreases the bandwidth. Similarly, implementing the strict FRFCFS policy with read priority, the conventional memory sub-system fails to address the read commands of read-modify-writes (RMW) and thus, bandwidth suffers due to the bus turnaround penalty.

Further, in implementing the strict FRFCFS policy with read priority, when there are multiple outstanding write commands that access the same bank as the read command but at a different row, the conventional memory sub-system will have to close the write command's row to open the row associated with the read command. Once the read command is completed, the conventional memory sub-system must then close the row associated with the read command and reopen the write command's row to continue issuing the write commands. The penalties associated with the extra row commands further reduces the overall bandwidth.

In addition, the conventional memory sub-system implementing the strict FRFCFS policy with read priority will issue write commands by prioritizing the ready write commands by order of their arrival in the command queue without considering memory components being accessed or the readiness of other commands in the queue. This can lead to very poor overall bandwidth when accessing memory components that require large durations of time between a write command and another command to the same partition or bank (e.g., a logical unit of storage in a memory component).

Aspects of the present disclosure address the above and other deficiencies by having a memory sub-system that prioritizes commands based on the number of bank accesses and implements parameters to allow for trading off latency for bandwidth.

When issuing ready write commands, the memory sub-system takes into consideration the effects of issuing a write command on the readiness of other commands in the command queue to improve bandwidth. The memory sub-system prioritizes write commands to a given bank by the number of outstanding commands to that given bank. The priority of the write command to the given bank increases with the number of outstanding commands to that given bank. Similarly, the memory sub-system may also prioritize the read commands associated with RMW commands to a given bank by the number of outstanding commands to that given bank. The priority of the read command associated with RMW commands to the given bank increases with the number of outstanding commands to that given bank.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system is a storage system. An example of a storage system is a SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes a command controller 113 that can be used to store data at a particular memory component based on a corresponding usage threshold. In some embodiments, the controller 115 includes at least a portion of the command controller 113. For example, the controller 115 can include a processor 117 (processing device) configured to execute instructions stored in local memory 119 for performing the operations described herein. In some embodiments, the command controller 113 is part of the host system 110, an application, or an operating system.

The command controller 113 can receive a command from a host system 120 and scheduling the command based on the type of command (e.g., read command, write command, read command associated with a RMW command, write associated with a RMW command, etc.) and the number of bank accesses to the bank associated with the command. The command controller 113 further schedules the command using threshold parameters that allow trading off latency and bandwidth based on the needs of applications. The command controller 113 may store the threshold parameters in storage (e.g., local memory 119). The threshold parameters include (i) the "maximum read command age" which is a threshold parameter that specifies the amount of time a read command can remain in the command queue before all other commands that access the same bank are to be blocked and (ii) the "hard maximum read command age" is a threshold parameter that establishes the hard limit on the amount of time that a read command will sit in the command queue and be prevented from issuing by any other command on the same channel. The threshold parameters also include (iii) the "minimum reads before turnaround" which is a threshold parameter that sets the minimum number of read commands that need to be in the command queue before the command controller 113 can perform a write-to-read turnaround. The threshold parameters may also include (iv) the "maximum read buffer space for read-modify-writes" which is a threshold parameter that sets the amount of the read response buffer space available to read-modify-writes. Further details with regards to the operations of the command controller 113 are described below.

Figure 2:
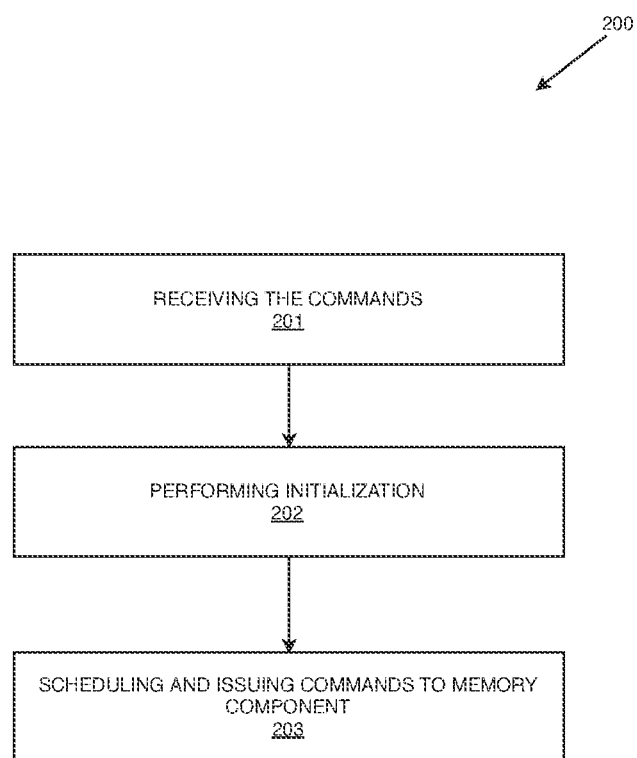
FIG. 2 is a flow diagram of an example method to increase bandwidth for command scheduling in accordance with some embodiments of the present disclosure.

FIG. 2 is a flow diagram of an example method 200 to increase bandwidth for command scheduling in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the memory command controller 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 201, the processing device receives the commands from the host system in a command queue. The commands may be, for example, read commands, read commands associated with read-modify-write (RMW) commands, write commands, or write commands associated with RMW commands. A RMW command is a sequence of commands that for some memory components or system configurations is required for modifying a partial unit of memory. The sequence of read and write commands that is required is termed a "read-modify-write" (RMW). At operation 202, the processing device performs initialization based on the commands. At operation 303, the processing device schedules and issues the commands in the command queue.

Figure 3:
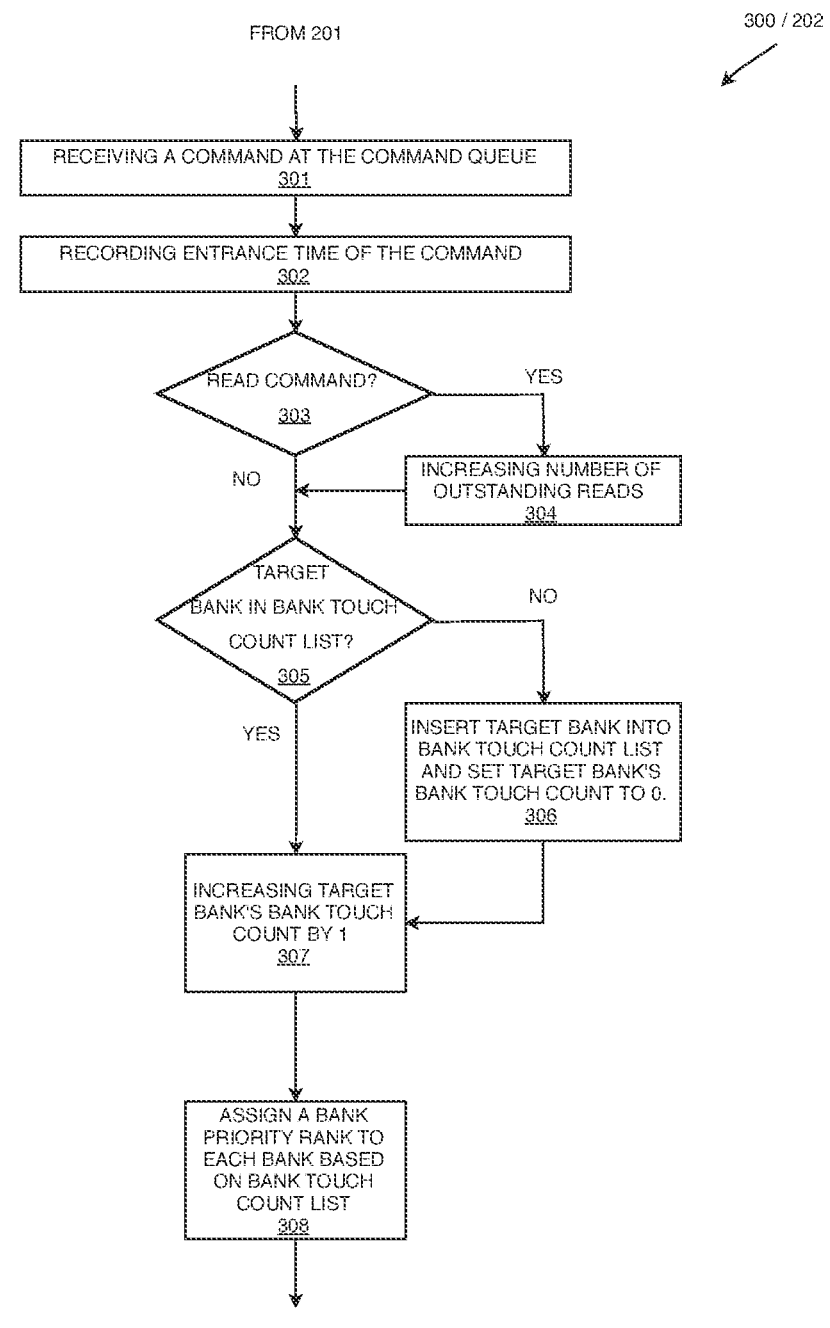
FIG. 3 is a flow diagram of an example method of performing initialization (operation 202 in FIG. 2) in the method to increase bandwidth for command scheduling in accordance with some embodiments of the present disclosure.

FIG. 3 is a flow diagram of an example method 300 of performing initialization (operation 202 in FIG. 2) in the method to increase bandwidth for command scheduling in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the memory command controller 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

To perform initialization, the processing device, at operation 301, receives a command at the command queue. At operation 302, the processing device records an entrance time of the command. The entrance time of the command is the time at which the command enters the command queue. The processing device may record the entrance time of the command based on a system timer included in the memory sub-system.

At operation 303, the processing device determines whether the command is a read command. If the command is a read command, at operation 304, the processing device increments the number of outstanding reads. The processing device may store the number of outstanding reads in the memory sub-system. Once the number of outstanding reads is incremented at operation 304 or if the command is not a read command at operation 303, the processing device updates a bank touch count list that includes a list of banks being accessed by the commands in the command queue and a bank touch count for each of the banks in the list that identifies a number of commands accessing each of the banks, respectively. The processing device may store the bank touch count list in the memory sub-system. To update the bank touch count list, the processing device determines at operation 305 if the target bank of the command is in the bank touch count list. The target bank is the bank being accessed by the command. If the target bank is not in the bank touch count list, the processing device inserts the target bank into the list of banks in the bank touch count list at operation 306. At operation 306, the processing device also sets the target bank's bank touch count to 0. At operation 307, the processing device increases the target bank's bank touch count by one.

At operation 308, the processing device assigns a bank priority rank to each of the banks in the list of banks. The bank priority rank is based on the bank touch count for each of the banks. A higher bank priority rank may be assigned to banks having a higher bank touch count.

In one embodiment, the processing device prioritizes write commands to a given bank by the number of outstanding commands to that given bank. If $B_T$ banks have outstanding commands, where $B_T$ is the number of banks touched, then the bank with the most outstanding commands will have P=0 and the bank with the fewest outstanding commands will have $P=B_T-1$. The priority of the write command (W) to the given bank increases with the number of outstanding commands (C) to that given bank (B) (i.e., the bank with the most outstanding commands will have the highest priority P and the bank with the least outstanding commands will have the lowest priority P, where P is the priority value of a bank). In one embodiment, the memory sub-system creates two priority queues for each bank touched or accessed by commands in the command queue and two additional priority queues which are the first and second highest priority queues (e.g., queues 0, −1). The two priority queues for each bank touched include a higher priority queue for commands accessing open rows and a lower priority queue for commands accessing closed rows. The processing device reserves the first and second highest priority queues (e.g., queues 0, −1) for read commands and elevated commands. Elevated commands are commands that are elevated because delaying their issue will necessarily delay the issuing of a read command. For example, when an older write command has a page conflict with a newer read command, the older write command is made an elevated command and issued so that the read can proceed. The processing device then reserves the remaining priority queues ($2*B_T$, where $B_T$ is the number of banks touched) for prioritizing the write commands. In this embodiment, the processing device a total number of priority queues that is equal to $2*B_T+2$, where $B_T$ is the number of banks touched. In one embodiment, when scheduling the write command (W) in the example above, the processing device inserts the write command (W) in the priority queue (−2*P)−2 (where P is the priority value of a bank) if the command row associated with the write command (W) is open and the processing device inserts the write command (W) in the priority queue (−2*P)−3 (where P is the priority value of a bank) if the command row associated with the write command (W) is closed.

In one embodiment, the processing device may use data structures in order to, for example, track the number of commands currently in the command queue that access each of the $B_T$ accessed banks. For a given bank (B) in the bank touch count list, the bank (B)'s index in the bank touch count list may indicate the priority of the write commands with respect of other write commands. In one embodiment, the bank touch count list further includes a bank touch map and each entry in the bank touch count list has a corresponding entry in the bank touch map. When a command is inserted or removed from the command queue, the processing device updates the bank touch count list. In one embodiment, the list of banks in the bank touch count list is a list data structure. The list data structure includes the list of banks in order of banks having the highest number of bank touch counts to banks having the lowest bank touch counts.

In one embodiment, in order to reduce the latency of the read transactions but also avoid having to pay penalties associated with turning the bus around, the processing device assigns to read commands associated with a RMW higher priority than a write command, but lower priority than a read command associated with read transactions. In one embodiment, the processing device prioritizes the read commands associated with RMW commands to a given bank by the number of outstanding commands to that given bank. The priority of the read command associated with RMW commands to the given bank increases with the number of outstanding commands to that given bank. In one embodiment, in addition to the first and second highest priority queues (e.g., queues 0, −1) for read commands and elevated commands and the priority queues ($2*B_T$, where $B_T$ is the number of banks touched) for prioritizing the write commands, the processing device further creates priority queues for prioritizing the read commands associated with RMW commands. In this embodiment, the processing device creates two priority queues for each bank touched or accessed by commands in the command queue ($2*B_T$) for the read commands associated with RMW commands. The two priority queues for each bank touched include a higher priority queue for commands accessing open rows and a lower priority queue for commands accessing closed rows. In this embodiment, the processing device creates a total number of priority queues that is equal to $2*(2*B_T)+2$, where $B_T$ is the number of banks touched. In this embodiment, the priority queues for the read commands associated with RMW commands have higher priority than the priority queues for the write commands and the write commands associated with RMW commands.

Figure 4:
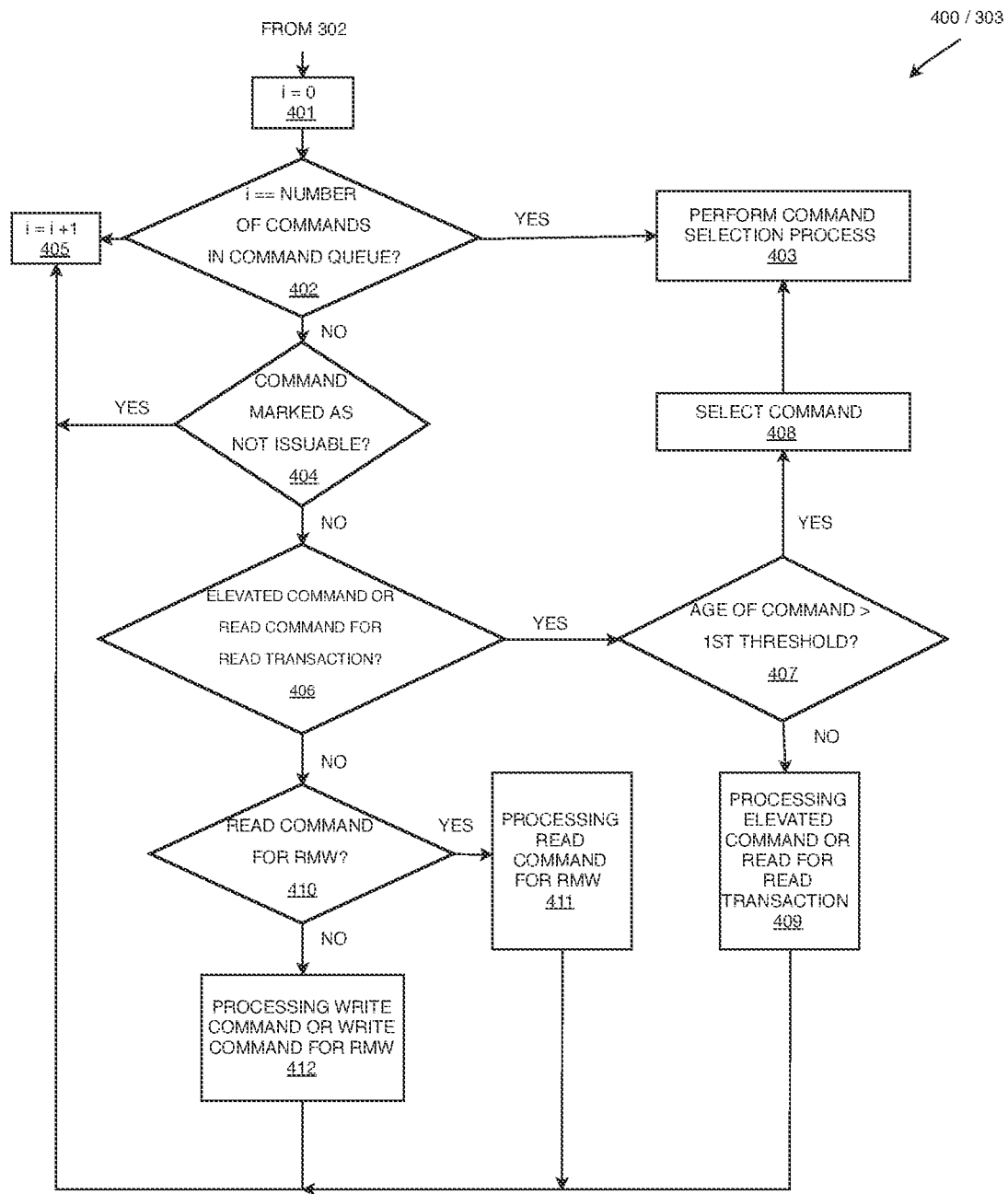
FIG. 4 is a flow diagram of an example method of scheduling and issuing the commands to the memory components (operation 203 in FIG. 2) in the method to increase bandwidth for command scheduling in accordance with some embodiments of the present disclosure.

FIG. 4 is a flow diagram of an example method 400 of scheduling and issuing the commands to the memory components (operation 203 in FIG. 2) in the method to increase bandwidth for command scheduling in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the memory command controller 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 401, the processing device resets an index associated with the commands in the command queue to 0. At operation 402, the processing device determines whether each of the commands have been considered and/or scheduled. The processing device may make this determination at operation 402 by comparing the index to the total number of commands in the command queue. If the index is equal to the total number of commands in the command queue, each of the commands have been considered and/or scheduled.

If the index is equal to the total number of commands in the command queue, at operation 403, the processing device performs a command selection process. Further details with regards to the processing device performing the command selection process are described below in relation to FIG. 5.

If the index is not equal to the total number of commands in the command queue, at operation 404, the processing device determines whether the command is marked as not issuable. If the command is marked as not issuable, at operation 405, the processing device increments the index and proceeds back to operation 402.

If the command not marked as not issuable, at operation 406, the processing device determines whether the command is an elevated command or a read command (i.e., a read command for a read transaction).

If the command is a read command or an elevated command, at operation 407, the processing device determines an age of the command based on the entrance time of the command in the command queue and determines whether the age of the command exceeds a first threshold. In one embodiment, the first threshold may be the "hard maximum read command age", which is a threshold parameter that establishes the hard limit on the amount of time that a read command will sit in the command queue and be prevented from issuing by any other command on the same channel.

When the age of the command exceeds the first threshold, at operation 408, the processing device selects the command and, at operation 403, performs the command selection process. When the age of the command does not exceed the first threshold, at operation 409, the processing device processes the elevated command or read command for a read transaction. Further details with regards to the processing device processing the elevated command or read command for a read transaction are described below in relation to FIG. 6.

If at operation 406, the command is not an elevated command or a read command for a read transaction, the processing device determines, at operation 410, whether the command is a read command for a RMW command. If the command is a read command for a RMW command, the processing device processes the read command for a RMW command. Further details with regards to the processing device processing the read command for a RMW command are described below in relation to FIG. 7.

If the command is a not read command for a RMW command, the command is a write command or a write command of a RMW command and the processing device processes the write command or the write command for a RMW command at operation 412. Further details with regards to the processing device processing the write command or the write command for a RMW command are described below in relation to FIG. 8.

Figure 5:
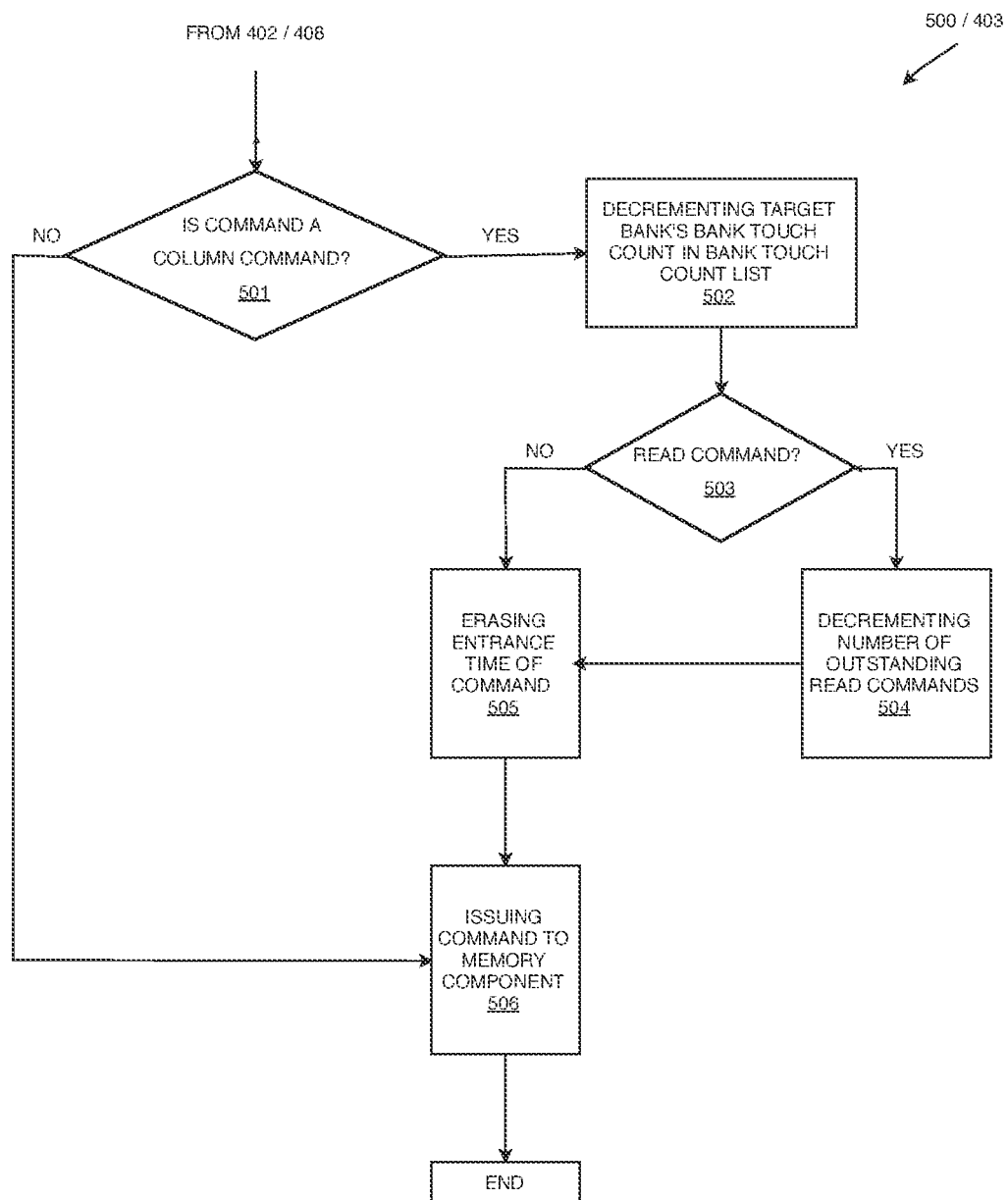
FIG. 5 is a flow diagram of an example method of performing a command selection process (operation 403 in FIG. 4) in the method to increase bandwidth for command scheduling in accordance with some embodiments of the present disclosure.

FIG. 5 is a flow diagram of an example method 500 of performing a command selection process (operation 403 in FIG. 4) in the method to increase bandwidth for command scheduling in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the memory command controller 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

To perform the command selection process, at operation 501, the processing device determines whether the command is a column command. In one embodiment, the column command is a command associated with a memory component that uses column-based addressing.

If the command is not a column command, at operation 506, the processing device issues the command to the memory component. If the command is a column command, at operation 502, the processing device decrements the bank touch count associated with the bank accessed by the command (e.g., the target bank). At operation 503, the processing device determines whether the command is a read command. If the command is a read command, at operation 504, the processing device decrements the number of outstanding read commands. At operation 505, the processing device erases an entrance time of the command from the memory sub-system and at operation 506, the processing device issues the command to the memory component.

Figure 6:
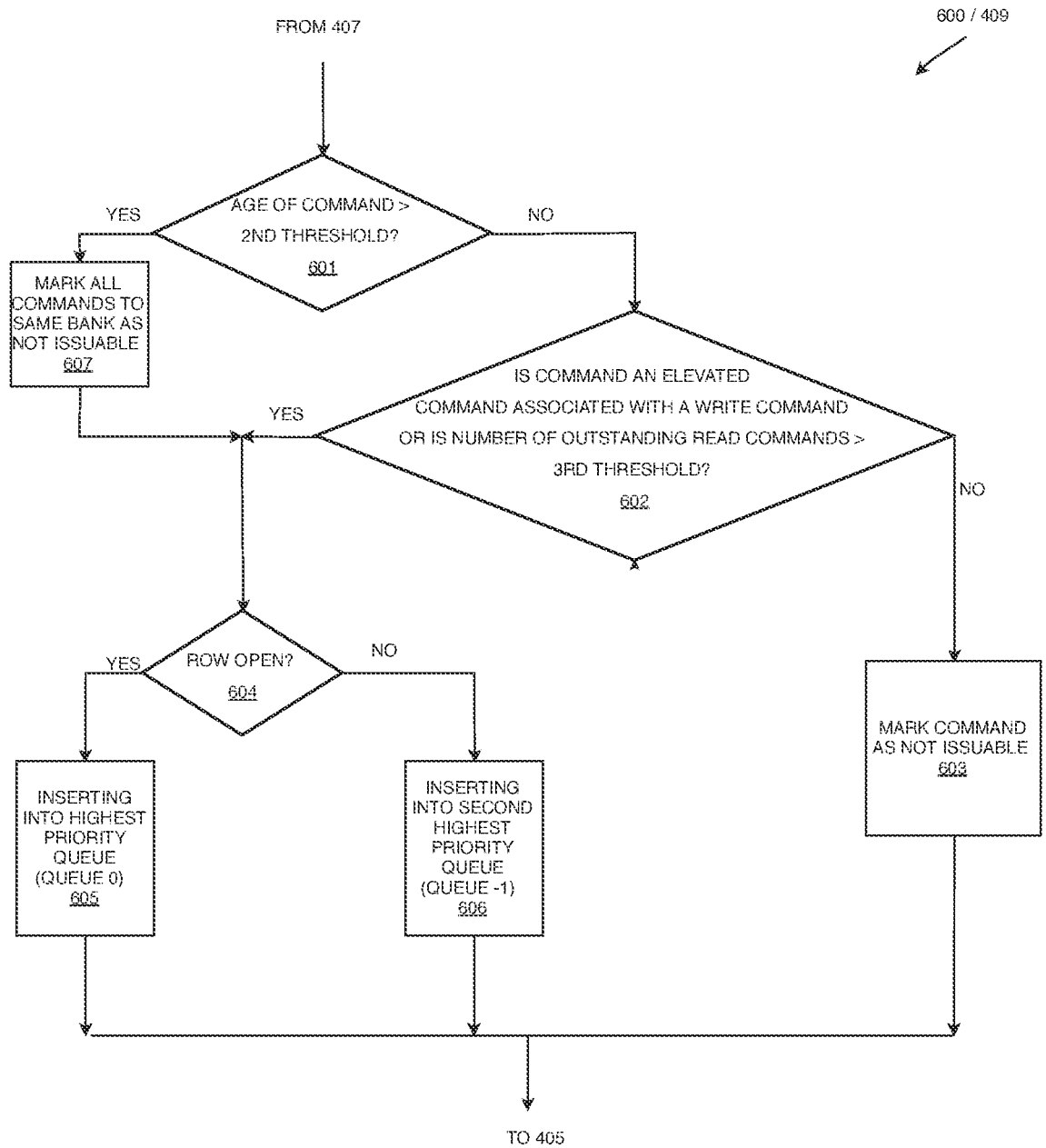
FIG. 6 is a flow diagram of an example method of processing an elevated command or read command for a read transaction (operation 409 in FIG. 4) in the method to increase bandwidth for command scheduling in accordance with some embodiments of the present disclosure.

FIG. 6 is a flow diagram of an example method 600 of processing an elevated command or read command for a read transaction (operation 409 in FIG. 4) in the method to increase bandwidth for command scheduling in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the memory command controller 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 601, the processing device determines whether the age of the command exceeds a second threshold. The second threshold may be the "maximum read command age" which is a threshold parameter that specifies the amount of time a read command can remain in the command queue before all other commands that access the same bank are to be blocked.

When the age of the command exceeds the second threshold, at operation 607, the processing device marks all other commands that access the same bank as not issuable. The processing device then proceeds to operation 604.

At operation 604, the processing device determines whether the command accesses an open row. In one embodiment, the command is associated with memory component that uses row-based addressing. If the command accesses an open row, at operation 605, the processing device inserts the command in the highest priority queue (e.g., queue 0 or first highest priority queue). If the command accesses a closed row, at operation 606, the processing device inserts the command in the second highest priority queue (e.g., queue−1).

When the age of the command does not exceed the second threshold, at operation 602, the processing device determines whether (i) the command is an elevated command associated with a write command or (ii) a number of outstanding read commands is greater than a third threshold. The third threshold may be the "minimum reads before turnaround" which is a threshold parameter that sets the minimum number of read commands that need to be in the command queue before the command controller 113 can perform a write-to-read turnaround. The "minimum reads before turnaround" threshold parameter avoids the excessive overheads that decrease the bandwidth due to the large penalties associated with turning the bus around and the closing and opening of rows to issue individual reads.

If the processing device determines that (i) the command is an elevated command associated with a write command or that (ii) a number of outstanding read commands is greater than a third threshold, the processing device proceeds to operation 604, as discussed above.

If the processing device determines that (i) the command is not an elevated command associated with a write command and that (ii) a number of outstanding read commands is not greater than a third threshold, at operation 603, the processing device marks the command as not issuable.

Figure 7:
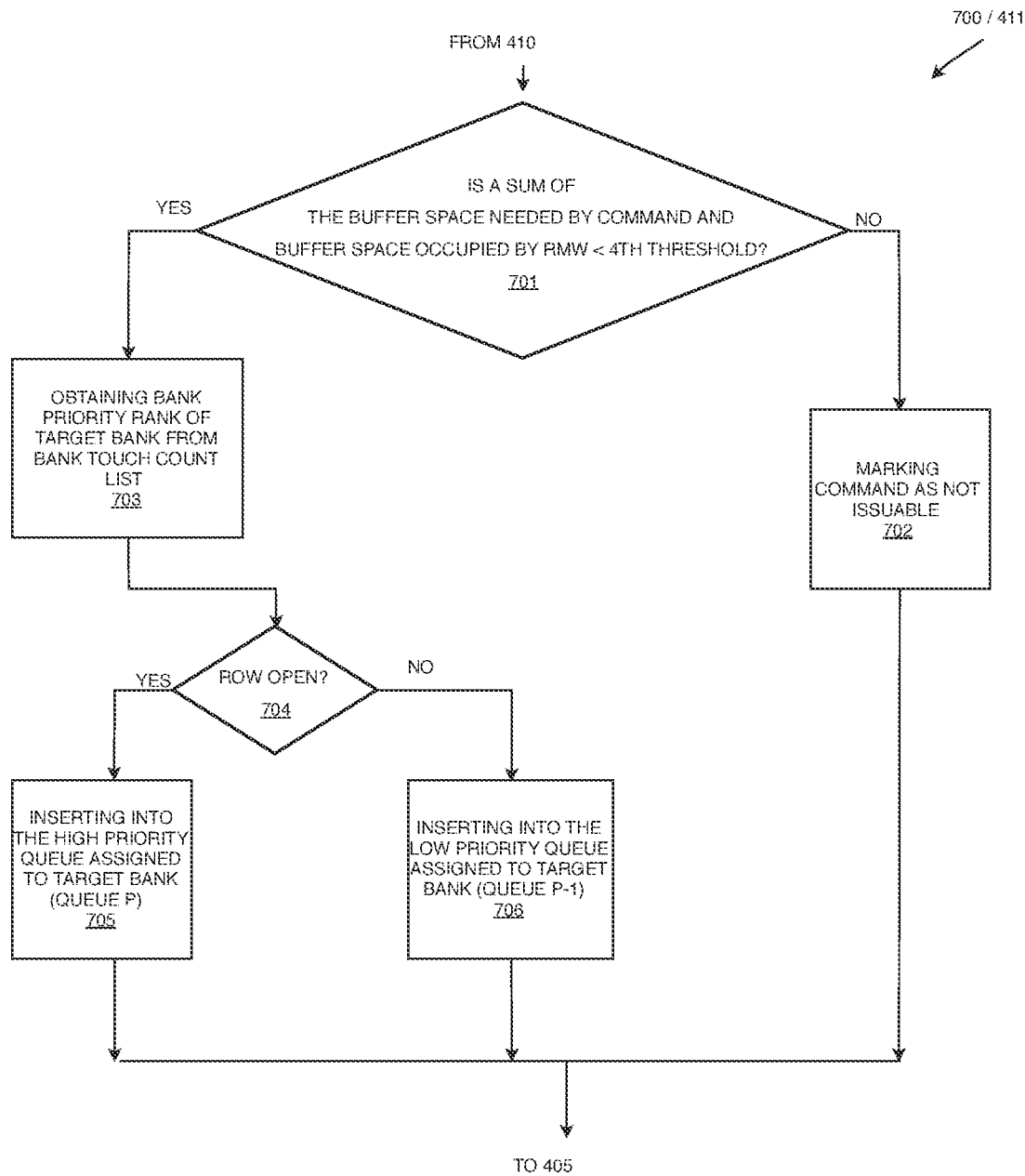
FIG. 7 is a flow diagram of an example method of processing a read command for a read-modify-write (RMW) transaction (operation 411 in FIG. 4) in the method to increase bandwidth for command scheduling in accordance with some embodiments of the present disclosure.

FIG. 7 is a flow diagram of an example method 700 of processing a read command for a read-modify-write (RMW) transaction (operation 411 in FIG. 4) in the method to increase bandwidth for command scheduling in accordance with some embodiments of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the memory command controller 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

To process the read command associated with the RMW command, at operation 701, the processing device determines whether a sum of a buffer space required by the command and a buffer space currently occupied by RMW commands in the command queue is less than a fourth threshold. The fourth threshold may be the "maximum read buffer space for read-modify-writes" which is a threshold parameter that sets the amount of the read response buffer space available to read-modify-writes. In one embodiment, the read response buffer is the storage that the processing device uses for holding the data from the memory component before returning the data to the processing device. RMW commands require a buffer space to temporarily store the data read by the read commands during modification and before writing the data back to the memory component. In one embodiment, the processing device uses the read response buffer as the buffer space for RMW commands. The "maximum read buffer space for read-modify-writes" threshold parameter ensures that the RMW commands are not using a large portion of the read response buffer and thus, blocking the incoming read commands from reserving space in the read response buffer. Without being able to reserve space in the read response buffer, the read commands are prevented from issuing due to not having buffer space to store the data returned from the memory component.

When the sum is not less than the fourth threshold, at operation 702, the processing device marks the command as not issuable. When the sum is determined to be less than the fourth threshold, at operation 703, the processing device obtains the bank priority rank of the bank being accessed by the command (e.g., target bank) from the bank touch count list.

At operation 704, the processing device determines whether the command is accessing an open row. If the command is accessing an open row, at operation 705, the processing device inserts the command into a priority queue that is associated with the bank priority rank. The priority queue is also the high priority queue assigned to the bank being accessed by the command. If the command is accessing a closed row, at operation 706, the processing device inserts the command into a priority queue that is associated with the bank priority rank. The priority queue is also the low priority queue assigned to the bank being accessed by the command.

In one embodiment, the processing device updates the bank priority rank (P) to be 2*P, the high priority queue assigned to the bank being accessed by the command is the queue P and the low priority queue assigned to the bank being accessed by the command is the queue P−1.

Figure 8:
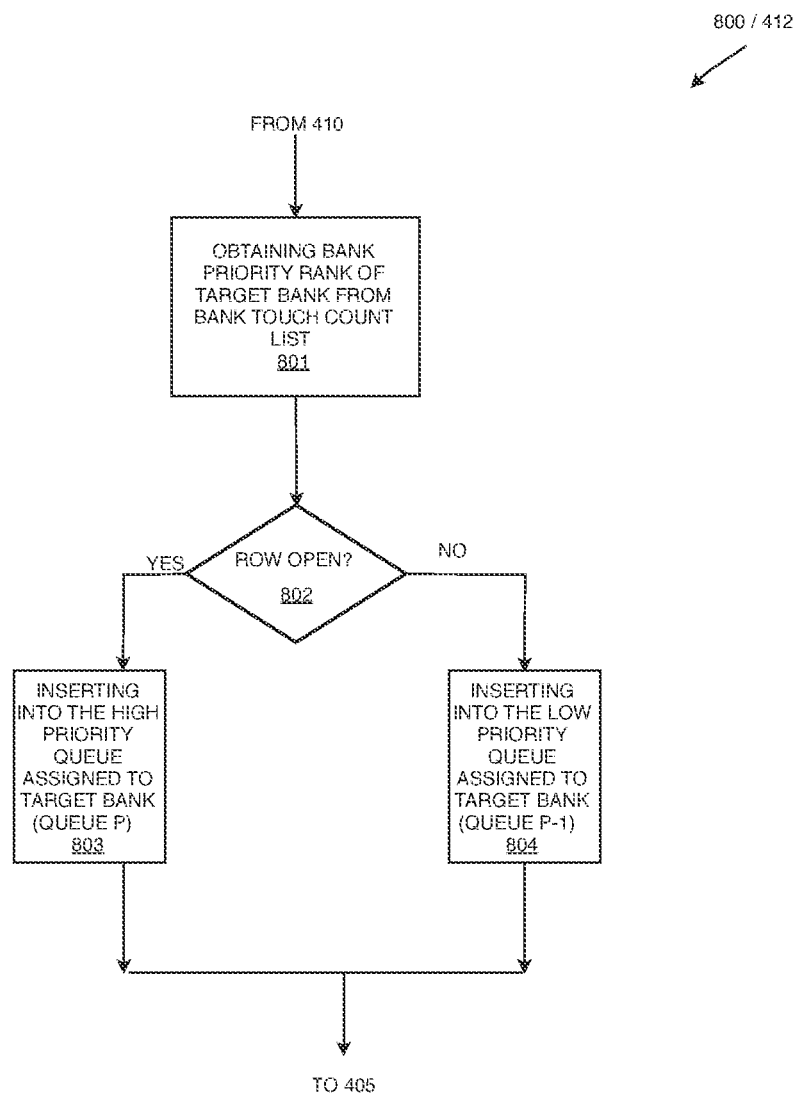
FIG. 8 is a flow diagram of an example method of processing a write command or a write command of a RMW command (operation 412 in FIG. 4) in the method to increase bandwidth for command scheduling in accordance with some embodiments of the present disclosure.

FIG. 8 is a flow diagram of an example method of processing a write command or a write command of a RMW command (operation 412 in FIG. 4) in the method to increase bandwidth for command scheduling in accordance with some embodiments of the present disclosure. The method 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 800 is performed by the memory command controller 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

To process a write command or a write command of a RMW command, at operation 801, the processing device obtains the bank priority rank of the bank being accessed by the command (e.g., target bank) from the bank touch count list.

At operation 802, the processing device determines whether the command is accessing an open row. If the command is accessing an open row, at operation 803, the processing device inserts the command into a priority queue that is associated with the bank priority rank. The priority queue is also the high priority queue assigned to the bank being accessed by the command. If the command is accessing a closed row, at operation 804, the processing device inserts the command into a priority queue that is associated with the bank priority rank. The priority queue is also the low priority queue assigned to the bank being accessed by the command.

In one embodiment, the processing device updates the bank priority rank (P) to be $2*(P-B_T)$, where $B_T$ is the number of banks being accessed. In this embodiment, the high priority queue assigned to the bank being accessed by the command is the queue P and the low priority queue assigned to the bank being accessed by the command is the queue P-1.

Figure 9:
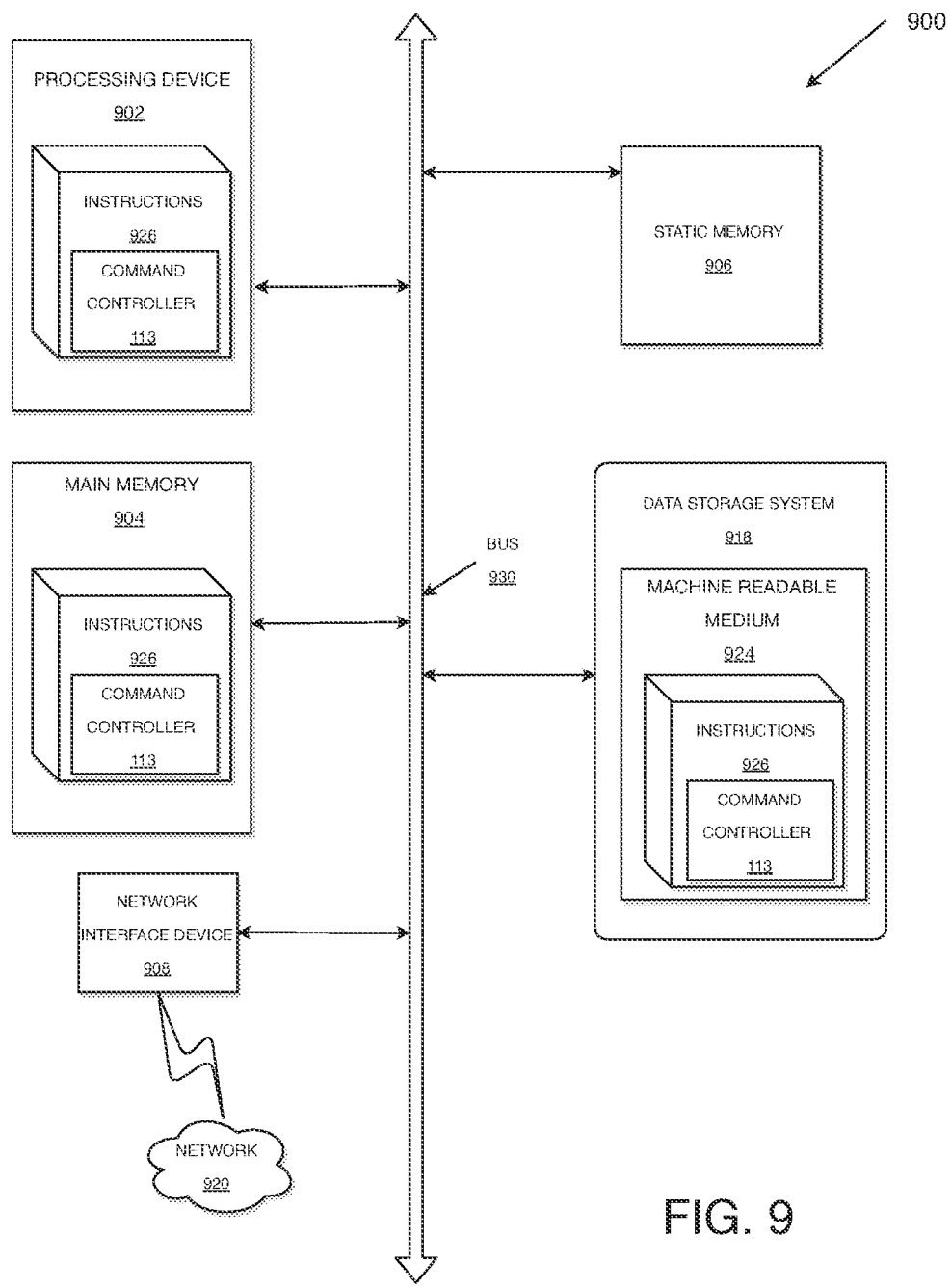
FIG. 9 is a block diagram of an example computer system in which embodiments of the present disclosure may operate.

FIG. 9 illustrates an example machine of a computer system 900 within which a set of instructions, for causing the machine to perform any one or more of the methodologies discussed herein, can be executed. In some embodiments, the computer system 900 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the command controller 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage system 918, which communicate with each other via a bus 930.

Processing device 902 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 can also be one or more special-purpose processing devices such as an application specific integrated circuit (ASIC), a field programmable gate array (FPGA), a digital signal processor (DSP), network processor, or the like. The processing device 902 is configured to execute instructions 926 for performing the operations and steps discussed herein. The computer system 900 can further include a network interface device 908 to communicate over the network 920.

The data storage system 918 can include a machine-readable storage medium 924 (also known as a computer-readable medium) on which is stored one or more sets of instructions 926 or software embodying any one or more of the methodologies or functions described herein. The instructions 926 can also reside, completely or at least partially, within the main memory 904 and/or within the processing device 902 during execution thereof by the computer system 900, the main memory 904 and the processing device 902 also constituting machine-readable storage media. The machine-readable storage medium 924, data storage system 918, and/or main memory 904 can correspond to the memory sub-system 110 of FIG. 1.

In one embodiment, the instructions 926 include instructions to implement functionality corresponding to a command controller to increase the bandwidth for command scheduling (e.g., the command controller 113 of FIG. 1). While the machine-readable storage medium 924 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks. CD-ROMs. and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory component and
a processing device, operatively coupled with the memory component, to perform operations comprising:
assigning a bank priority rank to each bank of a plurality of banks based on a plurality of bank touch counts of a memory device, wherein a bank touch count list comprises a plurality of bank touch counts and a list of the plurality of banks being accessed by a plurality of commands, wherein each bank touch count is associated with a bank in the bank touch count list; and
scheduling the plurality of commands in a command queue, wherein scheduling the commands comprises:
inserting each command of the plurality of the commands into a plurality of priority queues based on the bank touch count list, the inserting comprising:
inserting each command that is determined to be a read command or an elevated command into a first highest priority queue or a second highest priority queue that is for read commands and elevated commands,
inserting each command that is determined to be a read command associated with a read-modify-write (RMW) command into a first plurality of bank priority queues dedicated for read commands associated with RMW commands, and
inserting each command that is determined to be a write command or a write command associated with RMW commands into a second plurality of bank priority queues for write commands and write commands associated with RMW commands,
wherein the first highest priority queue and second highest priority queue are of a higher priority than the first plurality of bank priority queues, and
wherein the first plurality of bank priority queues is of a higher priority than the second plurality of bank priority queues.

2. The system of claim 1, wherein each bank in the list of banks is assigned a high priority queue and a low priority queue.

3. The system of claim 1, wherein the processing device is further to perform operations comprising:
scheduling the commands in the command queue, wherein scheduling the commands in the command queue comprises:
for a first command in the commands,
when the first command is a read command or an elevated command,
determining an age of the first command based on an entrance time of the first command in the command queue,
when the age of the first command exceeds a first threshold,
selecting the first command and performing a command selection process; or
when the age of the first command does not exceed the first threshold,
determining whether the age of the first command exceeds a second threshold,
when the age of the first command exceeds the second threshold,
inserting the first command in a first priority queue in response to the first command accessing an open row, wherein the first priority queue is a highest priority, or
insert the first command in a second priority queue in response to the first command accessing a closed row, wherein the second priority queue is a second highest priority.

4. The system of claim 3, wherein the processing device is further to perform operations comprising:
when the age of the first command does not exceed the second threshold,
when the first command is the elevated command associated with a write command or a number of outstanding read commands is greater than a third threshold, inserting the first command in the first priority queue in response to the first command accessing an open row, and
inserting the first command in the second priority queue in response to the first command accessing a closed row; or
when the first command is not the elevated command associated with a write command and when the number of outstanding read commands is not greater than the third threshold,
marking the first command as not issuable.

5. The system of claim 2, wherein the processing device is further to perform operations comprising:
scheduling the commands in the command queue, wherein scheduling the commands in the command queue comprises:
for a first command in the commands,
when the first command is the read command associated with the RMW command,
determining whether a sum of a buffer space required by the first command and a buffer space currently occupied by RMW commands in the command queue is less than a fourth threshold,
when the sum is less than the fourth threshold,
obtaining the bank priority rank of the bank being accessed by the first command from the bank touch count list,
inserting the first command in a third priority queue in response to the first command accessing an open row, wherein the third priority queue is associated with the bank priority rank and is the high priority queue assigned to the bank being accessed by the first command, and
inserting the first command in a fourth priority queue in response to the first command accessing a closed row, wherein the fourth priority queue is associated with the bank priority rank and is the low priority queue assigned to the bank being accessed by the first command; or
when the sum is not less than the fourth threshold, marking the first command as not issuable.

6. The system of claim 2, wherein the processing device is further to perform operations comprising:
scheduling the commands in the command queue, wherein scheduling the commands in the command queue comprises:
for a first command in the commands,
when the first command is the write command or the write command associated with the RMW command,
obtaining the bank priority rank of the bank being accessed by the first command from the bank touch count list,
inserting the first command in a fifth priority queue in response to the first command accessing an open row, wherein the fifth priority queue is associated with the bank priority rank and is the high priority queue assigned to the bank being accessed by the first command, or
inserting the first command in a sixth priority queue in response to the first command accessing a closed row, wherein the sixth priority queue is associated with the bank priority rank and is the low priority queue assigned to the bank being accessed by the first command.

7. The system of claim 2, wherein processing device is further to perform operations comprising:
performing a command selection process, wherein performing the command selection process comprises:
for a first command in the commands,
in response to the first command not being a column command, issuing the first command to the memory component, or
in response to the first command being a column command,
decrementing the bank touch count associated with the bank accessed by the first command, and
issuing the first command to the memory component.

8. The system of claim 7, wherein the processing device is further to perform operations comprising:
in response to the first command being a column command,
decrementing a number of outstanding read commands in response to the first command being a read command, and
erasing an entrance time of the first command.

9. The system of claim 2, wherein the processing device is further to perform operations comprising:
recording an entrance time of each of the plurality of commands into the command queue, and
incrementing a number of outstanding read commands for each of the plurality of commands that is determined to be a read command.

10. A method comprising:
assigning a bank priority rank to each bank of a plurality of banks based on a plurality of bank touch counts of a memory device, wherein a bank touch count list comprises a plurality of bank touch counts and a list of the plurality of banks being accessed by a plurality of commands, wherein each bank touch count is associated with a bank in the bank touch count list; and
scheduling the plurality of commands in a command queue, wherein scheduling the commands comprises:
inserting each command of the plurality of the commands into a plurality of priority queues based on the bank touch count list, the inserting comprising:
inserting each command that is determined to be a read command or an elevated command into a first highest priority queue or a second highest priority queue that is for read commands and elevated commands,
inserting each command that is determined to be a read command associated with a read-modify-write (RMW) command into a first plurality of bank priority queues dedicated for read commands associated with RMW commands, and
inserting each command that is determined to be a write command or a write command associated with RMW commands into a second plurality of bank priority queues for write commands and write commands associated with RMW commands,
wherein the first highest priority queue and second highest priority queue are of a higher priority than the first plurality of bank priority queues, and
wherein the first plurality of bank priority queues is of a higher priority than the second plurality of bank priority queues.

11. The method of claim 10, wherein each bank in the list of banks is assigned a high priority queue and a low priority queue.

12. The method of claim 10, further comprising:
scheduling the commands in the command queue, wherein scheduling the commands in the command queue comprises:
for a first command in the commands,
when the first command is a read command or an elevated command,
determining an age of the first command based on an entrance time of the first command in the command queue,
when the age of the first command exceeds a first threshold,
selecting the first command and performing a command selection process; or when the age of the first command does not exceed the first threshold,
determining whether the age of the first command exceeds a second threshold,
when the age of the first command exceeds the second threshold,
inserting the first command in a first priority queue in response to the first command accessing an open row, wherein the first priority queue is a highest priority, or
insert the first command in a second priority queue in response to the first command accessing a closed row, wherein the second priority queue is a second highest priority.

13. The method of claim 12, further comprising:
when the age of the first command does not exceed the second threshold,
when the first command is the elevated command associated with a write command or a number of outstanding read commands is greater than a third threshold,
inserting the first command in the first priority queue in response to the first command accessing an open row, or
inserting the first command in the second priority queue in response to the first command accessing a closed row; or
when the first command is not the elevated command associated with a write command and when the number of outstanding read commands is not greater than the third threshold,
marking the first command as not issuable.

14. The method of claim 11, further comprising:
scheduling the commands in the command queue, wherein scheduling the commands in the command queue comprises:
for a first command in the commands,
when the first command is the read command associated with the RMW command,
determining whether a sum of a buffer space required by the first command and a buffer space currently occupied by RMW commands in the command queue is less than a fourth threshold,
when the sum is less than the fourth threshold,
obtaining the bank priority rank of the bank being accessed by the first command from the bank touch count list,
inserting the first command in a third priority queue in response to the first command accessing an open row, wherein the third priority queue is associated with the bank priority rank and is the high priority queue assigned to the bank being accessed by the first command, or
inserting the first command in a fourth priority queue in response to the first command accessing a closed row, wherein the fourth priority queue is associated with the bank priority rank and is the low priority queue assigned to the bank being accessed by the first command; or
when the sum is not less than the fourth threshold, marking the first command as not issuable.

15. The method of claim 11, further comprising:
scheduling the commands in the command queue, wherein scheduling the commands in the command queue comprises:
for a first command in the commands,
when the first command is the write command or the write command associated with the RMW command,
obtaining the bank priority rank of the bank being accessed by the first command from the bank touch count list,
inserting the first command in a fifth priority queue in response to the first command accessing an open row, wherein the fifth priority queue is associated with the bank priority rank and is the high priority queue assigned to the bank being accessed by the first command, or
inserting the first command in a sixth priority queue in response to the first command accessing a closed row, wherein the sixth priority queue is associated with the bank priority rank and is the low priority queue assigned to the bank being accessed by the first command.

16. The method of claim 11, further comprising:
performing a command selection process, wherein performing the command selection process comprises:
for a first command in the commands,
in response to the first command not being a column command,
issuing the first command to a memory component, or
in response to the first command being a column command,
decrementing the bank touch count associated with the bank accessed by the first command, and
issuing the first command to the memory component.

17. The method of claim 16, further comprising:
in response to the first command being a column command,
decrementing a number of outstanding read commands in response to the first command being a read command, and
erasing an entrance time of the first command.

18. The method of claim 11, further comprising:
recording an entrance time of each of the plurality of commands into the command queue, and
incrementing a number of outstanding read commands for each of the plurality of commands that is determined to be a read command.

19. A non-transitory computer-readable storage medium comprising instructions that, when executed by a processing device, causes the processing device to perform operations comprising:
assigning a bank priority rank to each bank of a plurality of banks based on a plurality of bank touch counts of a memory device, wherein a bank touch count list comprises a plurality of bank touch counts and a list of the plurality of banks being accessed by a plurality of commands, wherein each bank touch count is associated with a bank in the bank touch count list; and
scheduling the plurality of commands in a command queue, wherein scheduling the commands comprises:
inserting each command of the plurality of the commands into a plurality of priority queues based on the bank touch count list, the inserting comprising:
inserting each command that is determined to be a read command or an elevated command into a first highest priority queue or a second highest priority queue that is for read commands and elevated commands,
inserting each command that is determined to be a read command associated with a read-modify-write (RMW) command into a first plurality of bank priority queues dedicated for read commands associated with RMW commands, and inserting each command that is determined to be a write command or a write command associated with RMW commands into a second plurality of bank priority queues for write commands and write commands associated with RMW commands, wherein the first highest priority queue and second highest priority queue are of a higher priority than the first plurality of bank priority queues, and wherein the first plurality of bank priority queues is of a higher priority than the second plurality of bank priority queues.

20. The non-transitory computer-readable storage medium of claim 19, wherein each bank in the list of banks is assigned a high priority queue and a low priority queue.

* * * * *